United States Patent

[11] 3,622,396

[72] Inventors Angelo Fernandez
  Bridgeport, Conn.;
  Robert G. McKelvey, Willowick, Ohio
[21] Appl. No. 12,703
[22] Filed Feb. 19, 1970
[45] Patented Nov. 23, 1971
[73] Assignee ESB Incorporated

[54] METHOD FOR DETECTING MISPOSITIONED PARTS
12 Claims, 2 Drawing Figs.

[52] U.S. Cl. .................................................. 136/176,
  136/182, 250/215, 250/222
[51] Int. Cl. ........................................................ H01m 39/00
[50] Field of Search ............................................. 136/175,
  176, 182; 250/215, 219 DR, 222

[56] References Cited
UNITED STATES PATENTS
2,999,166 9/1961 Schunack .................... 250/222
3,404,250 10/1968 Griffiths ...................... 250/219
3,544,754 3/1963 Buttke et al. ................ 136/176

Primary Examiner—Donald L. Walton
Attorneys—Alfred J. Snyder, Jr., Robert H. Robinson, Raymond L. Balfour and Anthony J. Rossi ABSTRACT: A method for detecting mispositioned parts in assemblies of parts wherein the orientation of one of the parts of an assembly of parts is to be controlled relative to at least one other part in the assembly of parts. The method includes applying a light-reflective-marking pigment to a part whose orientation is to be controlled. The marking pigment is applied to the part at a time when its orientation is known and prior to its assembly with at least one other part of the assembly of parts. An examination of assembled parts is made by a light-sensing device, and by the response of the light-sensing device to the presence or absence of light reflected from the marking pigment, mispositioned parts in the assembly of parts are detected.

In particular, the method disclosed is applicable to checking the orientation of storage battery cell elements in their containers.

PATENTED NOV 23 1971 3,622,396

INVENTORS.
ANGELO FERNANDEZ
ROBERT G. McKELVEY

METHOD FOR DETECTING MISPOSITIONED PARTS

BACKGROUND OF THE INVENTION

1. Field of the Invention

This invention relates to a method for detecting mispositioned parts in assemblies of parts. More particularly, it relates to a method for detecting mispositioned cell elements in battery containers.

The invention will hereinafter be described in most detail in association with the manufacture of storage batteries since the method according to the invention has been particularly developed for such use, however, the method may be used in other environments or the manufacturing of other apparatus for which such a method would be appropriate.

2. Description of the Prior Art

It may be explained that the structure within a storage battery cell is called the cell element. The cell element is made up of positive plates, negative plates and separators. Each of the positive plates are welded together and each of the negative plates are welded together. The member connecting the positive plates together is called the positive strap and the member connecting the negative plates together is called the negative strap. Further, in the typical steps of manufacturing lead acid storage batteries, there are one or more locations where the polarity of the cell elements is positively identified. These locations are basic to the battery manufacturer although they differ with different manufacturing facilities. A typical location whereat the polarity of the cell elements is positively identified in the "Burning Jig" where the individual plates are burned or welded together to form the strap.

At some later point in the manufacturing operation, the cell element is placed in the battery container. Proper placement or orientation of the cell element in the battery container is critical if the battery is to be compatible with the electrical circuit with which the battery is to used. Furthermore, it is also necessary that the relative orientation of the several cell elements in a multiple cell battery be in accordance with the battery design.

In order to insure proper assembly and subsequent use of batteries, manufacturers have adopted a system which establishes a reference point. It is customary to have an emblem or other marking, such as a brand-identifying mark, on one side of the battery container and this marking is the usual reference point for the location and polarity of the battery terminals. If the cell element or elements have been properly oriented in the battery container, a predetermined relationship will exist between the identifying mark on the battery container and the position of the terminal post, usually the positive terminal post. This predetermined relationship, if it is maintained, will assure that the battery is compatible with the electrical circuit where it is to be used.

It may be pointed out here, that if the relative orientation of the several cell elements in a multiple cell battery are not in accordance with the intended battery design, the battery will have short life in comparison to its expected design life. The reason for this is that if due to inadvertance at the cell element insertion point during the manufacture of the battery, a cell element is inserted in reverse orientation from that prescribed by the battery design, the plates that are intended to be the positive plates will be forced to become negative plates, and the plates intended to serve as the negative plates will be forced to become positive plates.

It is often difficult, if not impossible, to find this fault after the battery is completed. If such a misassembled battery is put in service, short life and customer dissatisfaction will result.

This fault of improper insertion of cell elements in the battery container during manufacture is prevalent enough to warrant an inspector whose duty it is to see that the cell elements have been properly placed in the battery container. Unfortunately, it has been found that even the best inspector is not infallible. Also, the cost of the inspector becomes burdensome.

Attempts have been made to insure proper insertion of cell elements by designing the battery parts to be assymetric which allows for only a single-assembly position. However, such battery designs necessitate a greater inventory of parts than is required for symetric cell element designs. Also, assymetric cell elements are generally not useable in alternate battery designs.

From the foregoing, it will be understood that there is a need for an automatic, rapid and nontiring cell element position checking method.

SUMMARY OF THE INVENTION

In accordance with the method of this invention, a part whose orientation is to be controlled in an assembly of parts, such as a battery cell element, has applied thereto a light-reflective-orientation marking at a time when its orientation is known. The marked part is assembled with at least one other part, i.e., the cell element is inserted into the battery. The thus-formed assembly of parts is positioned in a predetermined position with respect to the other part, i.e., orientation of the battery container is used as a reference for the positioning of the assembled parts. A light beam, reflected from the location where the marking is desired, is sensed by a light detecting means sensitive to the radiation from the marking to indicate with certainty if the part whose position is to be controlled is properly oriented relative to the other part, i.e., if the cell element is properly oriented in the battery container, the light-detecting means will indicate this. As an alternate, one can sense the absence of the reflection of the marking on the alternate battery part.

A more complete understanding of the nature and scope of the invention will be found in the following detailed description taken in conjunction with the accompanying drawings.

DESCRIPTION OF THE PREFERRED EMBODIMENTs

The method of this invention will hereinafter be described in the manner in which it would be implemented by the user of an apparatus designed to carry out the invention.

Figure 1:
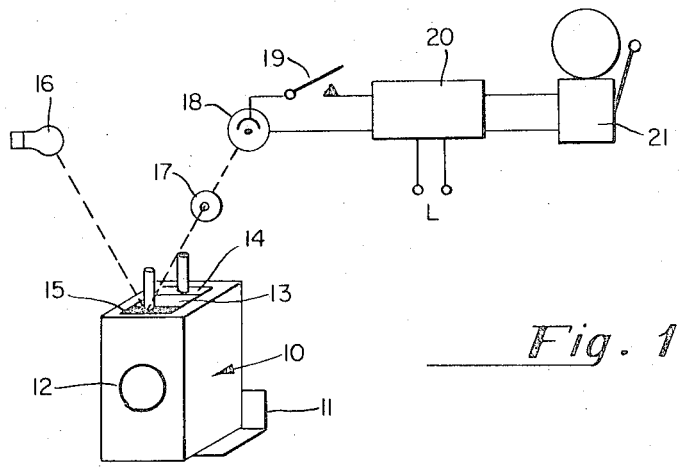
FIG. 1 is an embodiment of apparatus for implementing the method of this invention as applied to a battery having a single cell.

In FIG. 1, 10 represents a single-cell battery container with a cell element 13 therein. Container 10 has been placed by the user on an inspection stand indicated by shelf 11 in such a manner that an emblem 12, such as the brand identifying label of the manufacturer, faces outward as shown. Cell element 13 is comprised of positive plates, negative plates and separators and having straps 14 and 15 connected together respectively to the negative and positive plates. Prior to insertion of the cell element 13 in the container 10, the positive strap 15 has been coated with an identifying light-reflective pigment.

A source of radiant energy such as would be supplied by a light bulb 16, is directed onto the positive strap 15. Some of the light is reflected by the positive strap 15. Because of the pigmented coating, the reflected beam will be high in the desired light spectrum. A colored filter 17 is located in the path of the beam of light which passes from strap 15 to a photoelectric cell 18. Filter 17 is chosen to transmit the spectrum of the light reflected from pigmented positive strap 15 and yet to be quite opaque to light from the negative strap 14 that has not been pigmented. Suitable light baffles and lenses (not shown) may be arranged to direct the light beam along its path from the bulb 16 to photoelectric cell 18. The electrical output of photoelectric cell 18 is fed via switch 19 to amplifying device 20 and then to an indicating device 21, in this case an electric bell. The amplifying device is not critical to the invention and a relay or similar device would be suitable. The test for proper location of the cell element 13 in container 10 would consist of the following operations:

1. Place the container with the element inside onto shelf 11 with the emblem 12 facing out.

2. Depress switch 19.

If the pigmented positive strap 15 is in the location irradiated by light from bulb 16, rays of the chosen spectrum will pass through filter 17, excite photoelectric cell 18 and produce a signal in the output. The signal will be amplified by amplifier 20 and energize indicator 21 thus showing that positive strap 15 is in the proper location.

If the unpigmented strap 14 should be in the irradiated position, there will not be sufficient radiation passing through filter 17 to excite photoelectric cell 18. Consequently, there will be no signal supplied to the indicator 21 and thus it will be known that cell element 13 has been mispositioned in the container.

Figure 2:
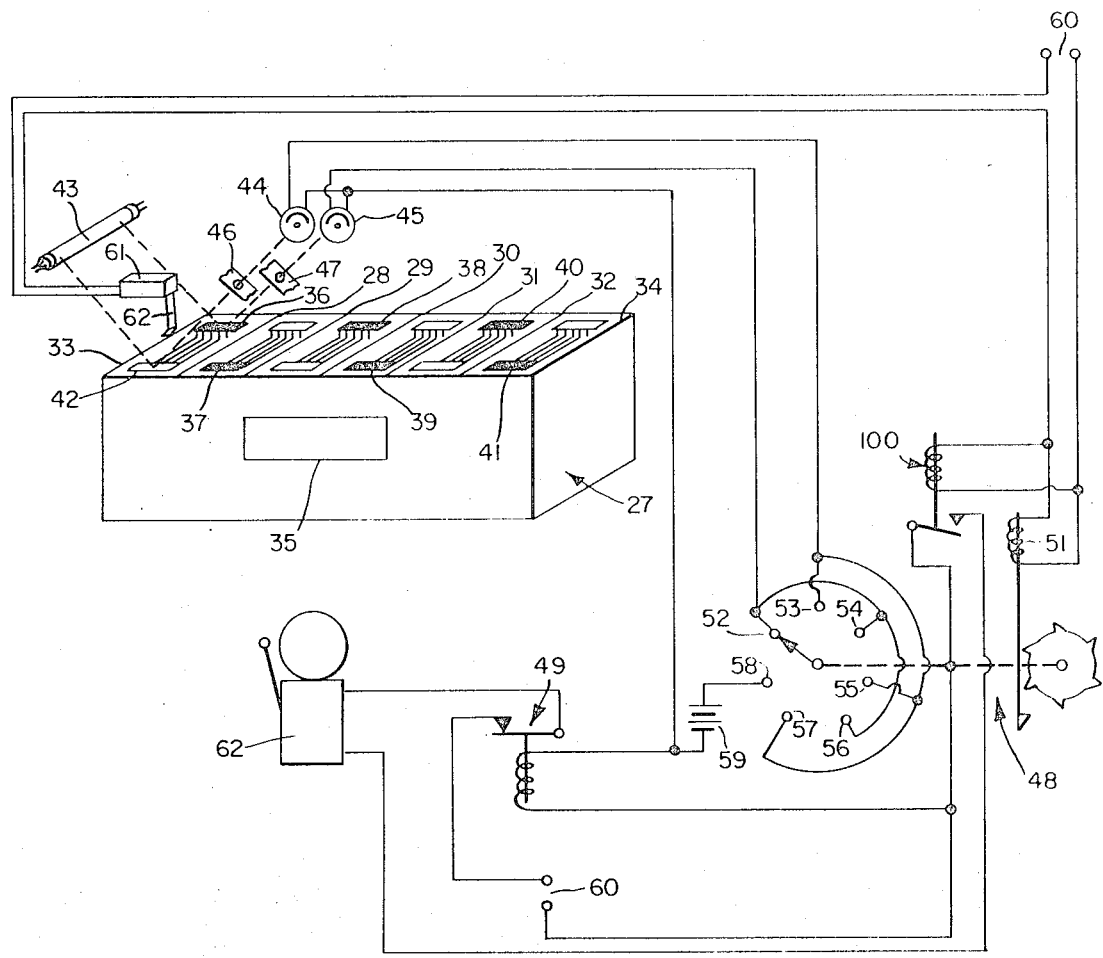
FIG. 2 is a second embodiment of apparatus for implementing the method of this invention as applied to a six-cell battery.

FIG. 2 shows another form of the apparatus adapted to testing a typical six-cell storage battery. Battery container 27 has six-cell compartments into each of which a cell element has been placed. Five cell partitions 28-32, molded integrally with the battery container, separate the cells and form walls for the cell compartments. Battery container 30 also has two end walls 33 and 34.

Emblem 35 identifies the front of the battery container. The positive straps of each element 36-41 have been coated with a fluorescent dye. The six negative plate straps, of which 42 is an example, are not so coated. As is well known in the art, for particular battery design the location of the positive strap in the first or right-hand cell must always be either near or away from the emblem side. Succeeding cells then follow with cell polarity alternately opposite to and the same as the first cell. When cells are connected together in the normal way, the battery voltage will then be the sum of the individual cell voltages. Cell elements, either terminal or middle, not so located according to the battery design, are termed "mispositioned" in this discussion. In this embodiment of the invention, an ultraviolet light source 43 illuminates the battery with ultraviolet light. A pair of light cells, 44 and 45, are arranged to intersect the path of light reflected from the battery strap positions 36 and 42. Viewing holes 46 and 47 limit the area being observed by light cells 44 and 45 to two roughly defined inspection areas. Light cells 44 and 45 are chosen to be responsive to fluorescent light waves and unresponsive to ultraviolet light waves. The outputs of cells 44 and 45 are led to a discriminator circuit shown here as stepping switch 48 and relays 49 and 100. Switch 48 is operated by magnetic coil 51 and has seven switch positions, 52, 53, 54, 55, 56, 57, and 58. Positions 52, 54 and 56 are connected together and to the output of light cell 45. Positions 53, 55 and 57 are connected together and to the output of light cell 44. Position 58 is connected to a small battery 59. Power to operate stepping switch 48 comes from power supply 60 through sensing switch 61. Switch 61 is closed when a container partition or end wall pushes against switch arm 62.

The output of stepping switch 48 is led to the operating coil of sensitive normally closed relay 49. Relay 100 whose coil is in parallel with the coil 51 of stepping switch 48 controls the flow of power from line 60 through relay 49 to alarm bell 62.

In operation, a battery container having the emblem 35 facing out is positioned under the device and moved by a transfer device (not shown) to the left as viewed in FIG. 2. Arm 62 is lifted by the first end wall 33 of container 27, closing the circuit of switch 61. Stepping switch 48 advances from position 58 to position 52 and relay 100 closes the circuit to alarm bell 62. At the same time, however, ultraviolet light from source 43 irradiates both battery straps 36 and 42. Strap 36 having a coating of fluorescent dye emits visible light, whereas strap 42 not so coated, reflects ultraviolet light. Visible light falling on light cell 45 causes an electric current to be generated and this flows through position 52 of stepping switch 48 and from there to the coil of relay 49 opening this relay and opening the alarm bell circuit. In this case, the cell element is properly located and there will be no alarm. The battery container is then moved further to the left, switch 61 opens and is then closed by switch arm 62 striking the first partition 28. This advances the stepping switch to position 53 and connects light cell 44 to relay 49, thus transposing the inspection area. If strap 37 having a coating of fluorescent dye is in the test area, light cell 44 will energize relay 49 and no alarm will be given. This sequence of operations continues until the final strap 41 has been tested. If any of the marked straps 36 to 41 should be mispositioned in the battery case, the light cells would not be excited and relay 49 would remain closed and bell 62 would sound an alarm. After the sixth strap 41 has been examined, the container end wall 27 will activate switch 61. Since there are no straps located outside of the battery container, an alarm would normally be given. However, when stepping switch 48 makes its seventh motion, it comes to location 58 and connects battery 59 to relay 49 opening the contacts and preventing the unwanted operation of alarm 62.

As an alternative to the apparatus described, two light sources are used, one focused on the first inspection area and the second on the second area. The light beam is transposed from one source to the other as successive cells are inspected. With such a double-light source, it is also possible to use a single-sensing device focused on the entire inspection area rather than the two sensing devices described above.

It should be pointed out in the above description that by the term light is meant any electromagnetic radiation within the range of infrared, visible and ultraviolet. Also, the term light reflective marking or pigment is used for any coating having an identifiable reflection spectrum and that it also includes materials such as phosphorescents or flourescents which upon radiation emit a light of a different spectral band from the initiating beam. A nonreflective coating is also included in this term. Finally, the term "light-detecting means" includes any suitable device for sensing the radiation reflected, emitted or reemitted by the radiated pigment such as photoconductive cells, photoemissive cells, thermocouples, etc.

It must be pointed out that within the scope of the invention, there are a number of alternate ways to implement the method of the invention. Some of these have been mentioned. For instance, the entire top of the cell element can be illuminated and only a desired area sensed by the light-sensing device. Alternately, the light source can be directed at a particular point and the light-sensing device can be directed at the entire top of the cell element. In this case, it is desirable to shield the battery from other light sources, or both the light beam and the sensing path may be directed at the same particular point.

Again, the signal can advise that the tested part is satisfactory or it can advise that a tested part is not satisfactory.

The presence of pigment in the inspection area can be used as an indication of correct positioning of the element, or its presence can be used as an indication of incorrect positioning. Because the battery parts are made of lead capable of having a rather high reflectivity, it may be desirable to use a dull nonreflective pigment for identification in order to get maximum contrast between signals. In this case, the presence of pigment in the inspection area would give a nil reading in the light-sensing device.

From the foregoing description, it will be seen that a method has been disclosed suitable for determining mispositioned cell elements in the battery containers with minimum human attention and at a high speed.

Having thus described our invention, we claim:

1. A method for detecting a mispositioned part in assemblies of parts wherein the orientation of one of the parts of an assembly of parts is to be controlled relative to at least one other part in the assembly of parts comprising:
   1. at a time when its orientation is known, placing an orientation marking on a part whose orientation is to be controlled,
   2. assembling the marked part with at least one other part,
   3. positioning the thus-formed assembly of parts in a predetermined position with respect to the other part of the assembly.
   4. illuminating the assembly,
   5. sensing the light reflected from the assembly, and 6. by the presence of absence of light reflected from the orientation marking, detecting mispositioned parts in the assembly.

2. A method as defined in claim 1 wherein the orientation marking is placed upon a preselected portion of the part whose orientation is to be controlled.

3. A method as defined in claim 2 wherein the preselected portion of the part whose orientation is to be controlled is illuminated, and sensing the light reflected from the preselected portion of the part whose orientation is to be controlled.

4. A method for detecting a mispositioned cell element in battery container comprising:
1. identifying a particular portion of a cell element by means of a pigment,
2. placing the cell element in a container,
3. orienting the container to a predetermined orientation,
4. illuminating the cell element positioned in the container,
5. sensing the light reflected from the cell element by light-sensing means, and
6. detecting a mispositioned cell element by the response of said light-sensing means.

5. A method as defined in claim 4 in which indication is given if said element is properly positioned in the battery container.

6. A method as defined in claim 4 in which an alarm is activated if said element is mispositioned in the battery container.

7. In the manufacture of storage batteries comprising a container having multiple cell compartments therein and a cell element having a predetermined polarity located in each of said compartments, a method for detecting mispositioned cell elements in the battery container comprising the steps of:
1. identifying with pigment a portion of each cell element prior to its placement in a cell compartment,
2. orienting the container to a predetermined orientation,
3. illuminating the container,
4. successively sensing the light reflected from an area of each of the cell elements until the light reflected from each cell element of the entire battery has been sensed, and
5. detecting the occurrence of misplaced cell elements by the presence of absence of light reflected from the cell elements.

8. A method as defined in claim 7 in which only a specific area including the desired location of the pigmented portion of the cell element is illuminated.

9. A method as defined in claim 7 in which the pigment is essentially nonreflective.

10. In the manufacture of lead acid storage batteries comprising a container having multiple cell compartments therein and a cell element having a predetermined polarity located in each of said compartments a method for detecting mispositioned cell elements in the battery comprising the steps of:
1. identifying with a pigment a chosen portion of each cell element prior to its placement in a cell compartment of the container,
2. after placing each of the cell elements of the battery in the container, orienting the container to a predetermined position,
3. illuminating by light means a first cell element,
4. sensing by a spectrally responsive means the light reflected from a selected portion of the first cell element,
5. shifting the relative position of the battery container with respect to the light source and light-sensing means to illuminate a second cell element,
6. sensing by the spectrally responsive means the light reflected from a selected portion of the second cell element,
7. successively shifting the relative position of the battery container with respect to the light source and light-sensing means until each of the cell elements of the battery have been illuminated by the light means and the light reflected from a selected portion of each of the cell elements has been sensed by the spectrally responsive means, and
8. detecting the occurrence of misplaced cell elements in the battery container by the response of the spectrally responsive means.

11. A method as defined in claim 10 in which the identified portion of the cell element is one of the two straps.

12. A method as defined in claim 11 in which the pigment is fluorescent and the light means a source of ultraviolet light.

* * * * *